(12) United States Patent
Löwstedt et al.

(10) Patent No.: US 11,918,945 B2
(45) Date of Patent: Mar. 5, 2024

(54) AIR FILTER HOUSING ARRANGEMENT

(71) Applicant: Volvo Truck Corporation, Gothenburg (SE)

(72) Inventors: Carl Löwstedt, Onsala (SE); Hans Rönnings, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 210 days.

(21) Appl. No.: 17/422,802

(22) PCT Filed: Jan. 16, 2019

(86) PCT No.: PCT/EP2019/051054
§ 371 (c)(1),
(2) Date: Jul. 14, 2021

(87) PCT Pub. No.: WO2020/147946
PCT Pub. Date: Jul. 23, 2020

(65) Prior Publication Data
US 2022/0080343 A1 Mar. 17, 2022

(51) Int. Cl.
*B01D 46/00* (2022.01)
*B01D 46/24* (2006.01)
(Continued)

(52) U.S. Cl.
CPC ...... *B01D 46/0004* (2013.01); *B01D 46/2411* (2013.01); *F02M 35/0201* (2013.01);
(Continued)

(58) Field of Classification Search
CPC ............ B01D 46/0002; B01D 46/0004; B01D 46/2411; B01D 46/521; B01D 2271/02;
(Continued)

(56) References Cited

U.S. PATENT DOCUMENTS 6,890,366 B2 * 5/2005 Bugli .................. F02M 35/024
55/501
7,914,609 B2 * 3/2011 Sullivan ................ B01D 50/20
95/271
(Continued)

FOREIGN PATENT DOCUMENTS

CN 1529627 A 9/2004
CN 107939564 A 4/2018
(Continued)

OTHER PUBLICATIONS

International Search Report and Written Opinion for International Patent Application No. PCT/EP2019/051054, dated Sep. 20, 2019, 14 pages.
(Continued)

*Primary Examiner* — Grant Moubry
(74) *Attorney, Agent, or Firm* — Withrow & Terranova, PLLC

(57) ABSTRACT

The present disclosure relates to an air filter housing arrangement (100) for a cylindrical air filter. In particular, the air filter housing arrangement comprises an at least partially cylindrical air filter housing (102) arranged to accommodate the cylindrical air filter, wherein the air filter housing comprises an axially and a radially open portion for allowing connection/removal of the cylindrical air filter in both an axial direction and a radial direction.

13 Claims, 4 Drawing Sheets

(51) Int. Cl.
*F02M 35/02* (2006.01)
*F02M 35/024* (2006.01)
*B01D 46/52* (2006.01)

(52) U.S. Cl.
CPC ..... *F02M 35/02483* (2013.01); *B01D 46/521* (2013.01); *B01D 2271/02* (2013.01); *B01D 2279/60* (2013.01)

(58) Field of Classification Search
CPC ........... B01D 2279/60; F02M 35/0201; F02M 35/0203; F02M 35/02483; F02M 35/02416
See application file for complete search history.

(56) References Cited

U.S. PATENT DOCUMENTS

| | | | |
|---|---|---|---|
| 9,322,370 B2* | 4/2016 | von Krane | ....... F02M 35/10144 |
| 2001/0000845 A1 | 5/2001 | Coulonvaux | |
| 2011/0167776 A1 | 7/2011 | Görg et al. | |
| 2014/0260144 A1 | 9/2014 | Williams et al. | |
| 2016/0108866 A1 | 4/2016 | Dewit et al. | |
| 2016/0332096 A1* | 11/2016 | Rolle | ..................... B01D 35/30 |
| 2017/0304760 A1 | 10/2017 | Kaufmann et al. | |
| 2017/0361260 A1 | 12/2017 | Campbell et al. | |
| 2018/0119653 A1* | 5/2018 | Ishizuka | ............ B01D 46/0046 |
| 2018/0372036 A1 | 12/2018 | Von Seggern et al. | |

FOREIGN PATENT DOCUMENTS

| | | | | |
|---|---|---|---|---|
| DE | 4326731 A1 * | 2/1995 | ......... | B01D 46/0004 |
| DE | 102009015097 A1 * | 10/2010 | ......... | B01D 46/0004 |
| EP | 2236187 A1 | 10/2010 | | |
| EP | 3315185 A1 | 5/2018 | | |
| JP | H04234556 A | 8/1992 | | |
| KR | 20180058496 A | 6/2018 | | |
| WO | 2009106590 A1 | 9/2009 | | |
| WO | 2017108299 A1 | 6/2017 | | |
| WO | 2018089825 A1 | 5/2018 | | |

OTHER PUBLICATIONS

International Preliminary Report on Patentability for International Patent Application No. PCT/EP2019/051054, dated Mar. 16, 2021, 26 pages.

First Office Action for Chinese Patent Application No. 201980088481.7, dated Apr. 19, 2022, 13 pages.

* cited by examiner

AIR FILTER HOUSING ARRANGEMENT

This application is a 35 USC 371 national phase filing of International Application No. PCT/EP2019/051054, filed Jan. 16, 2019, the disclosure of which is incorporated herein by reference in its entirety.

TECHNICAL FIELD

The present disclosure relates to an air filter housing arrangement for a cylindrical air filter. The air filter housing arrangement is applicable on vehicles that uses air filters for cleaning the intake air prior to supplying the intake air to the intake manifold of a medium and heavy duty internal combustion engine. The air filter housing arrangement of the present disclosure is thus particularly applicable for medium and heavy duty vehicles commonly referred to as trucks. Although the air filter housing arrangement will mainly be described in relation to a truck, it may also be applicable for other types of vehicles comprising air filters arranged in an air filter housing arrangement.

BACKGROUND

In connection to vehicles in the form trucks, also known as medium and heavy duty vehicles, an internal combustion engine is often used for propulsion thereof. The internal combustion engine is arranged to receive ambient air to an intake manifold thereof. The intake air is supplied to a combustion chamber of the internal combustion engine, where it is mixed with a combustion fuel before initiating the combustion process.

In order to keep the ambient air clean before use in the combustion process, the vehicle is often provided with an air cleaner of suitable type. The air cleaner is thus arranged upstream the inlet manifold of the internal combustion engine. The air cleaner conventionally comprises an air filter for cleaning the ambient air, wherein the air filter is positioned inside an air filter housing arrangement.

As ambient air contains pollutions and particles, the air filter will need to be cleaned from such particles, or replaced with a new, clean air filter at certain intervals. When cleaning or replacing the air filter, the air filter needs to be removed from the air filter housing arrangement.

However, as the air filter housing arrangement most often is fixedly connected to a part inside the engine compartment, the process of removing the air filter is relatively time consuming and may involve removal of other components for gaining access to the air filter. In particular, the available space within the engine compartment is rather restricted which makes removal of the air filter rather time consuming.

There is thus a desire to provide an air filter housing arrangement for simplifying connection and removal of the air filter to/from the air filter housing arrangement.

SUMMARY

It is an object of the present disclosure to describe an air filter housing arrangement which at least partially overcomes the above described deficiencies. This is achieved by an air filter housing arrangement according to claim 1.

According to a first aspect, there is provided an air filter housing arrangement for a cylindrical air filter, the air filter housing arrangement comprising an at least partially cylindrical air filter housing arranged to accommodate the cylindrical air filter, the air filter housing comprising a first axial end portion and a second axial end portion, wherein the air filter housing comprises a first open portion at the first axial end portion and a second open portion at an upper radial position of the air filter housing for allowing connection/removal of the cylindrical air filter in both an axial direction and a radial direction; and a removable housing cover comprising a first surface arranged to cover the first open portion of the air filter housing, and a second, axially extending surface arranged to cover the second open portion of the air filter housing, wherein one of the air filter housing and the housing cover comprises a sealing groove and the other one of the air filter housing and the housing cover comprises a sealing flange connected into the sealing groove for providing a seal between the air filter housing and the housing cover, wherein the sealing flange protrudes into the sealing groove in the axial direction at an axial end portion of the second open portion, and wherein the sealing flange protrudes into the sealing groove in a circumferential direction between the first axial end portion of the filter housing and the axial end portion of the second open portion.

The wording "first open portion" should be construed such that the at least partially cylindrical air filter housing is free from material at the first axial end portion such that an air filter can be positioned into the air filter housing axially via this opening. Likewise, the "second open portion" is thus an open portion of the air filter housing that allows the air filter to be positioned into the air filter housing in a radial direction. As such, when the housing cover is connected to the air filter housing, the first and second open portions are covered by the first and second surfaces of the cover. Hereby, the air filter is substantially encapsulated within the air filter housing and the cover. Moreover, the first and second surfaces of the housing cover are preferably connected to each other to form a one-piece unit. Preferably, the first surface is formed by a surface which is perpendicular to the axial direction of the cylindrical air filter housing.

Moreover, the wording "circumferential direction" should be construed as perpendicular to a radial and axial direction. The housing/cover may not be completely cylindrical, i.e. a rather "flat" surface may be present at the flange. Such minor flat surface should be construed as falling within the wording "circumferential".

Still further, the groove may preferably be arranged in a U-shape or the like. Hereby, the flange can be inserted into the U-shaped groove for forming a seal between the air filter housing and the housing cover. Thus, the "protrusion" of the flange is thus in the direction into the groove, not along the groove. Hence, the defined direction of the protruding portions should be understood as when the housing cover is connected to the air filter housing. Accordingly, in case the flange is present on the cover, the flange is defined to protrude into the sealing groove in a circumferential direction between the first axial end portion of the filter housing and the axial end portion of the second open portion when the cover is connected to the housing.

By means of the above description, an advantage is that the housing cover can be connected/removed from the air filter housing by either a pure axial displacement or by a relatively small axial displacement in combination with a radial displacement. Hereby, connection/removal of the housing cover to/from the air filter housing is simplified, which is highly beneficial in the relatively limited space of the engine compartment. Hence, filter change can be made more rapidly and the air filter arrangement can be arranged within the engine compartment at new positions which does not allow removal solely in the axial direction. Further, in combination with the simplified connection/removal of the housing cover, a well functioning seal between the housing cover and the air filter housing is provided for preventing e.g. particles from the engine compartment to reach the air filter. The seal also prevents e.g. water from reaching the air filter. Hence, water is prevented from reaching the inlet of the internal combustion engine.

According to an example embodiment, the sealing flange may protrude into the sealing groove in the axial direction at the first axial end portion of the air filter housing.

Accordingly, a well defined seal is also present at the front end of the air filter housing. The housing cover is thus connected to the air filter housing by axially inserting the housing cover to the air filter housing at the first axial end portion of the air filter housing.

According to an example embodiment, the first and second open portions may be formed by a continuous edge, wherein the sealing flange/sealing groove is formed throughout the continuous edge.

Thus, when the air filter housing comprises the sealing flange, a continuous sealing flange, which changes protruding direction at the axial end portions, is arranged all around the first and second open portions of the air filter housing. When the air filter housing comprises the sealing groove, the groove is arranged as a continuous groove. The same applies for the housing cover.

According to an example embodiment, the sealing flange may protrude a distance between 5-40 mm into the sealing groove.

A distance of 5-40 mm have been identified as providing a sufficient seal as well as it still gives the improved freedom of not having to move the housing cover too far in a certain direction when connecting/removing the housing cover from the air filter housing.

According to an example embodiment, the air filter housing arrangement may further comprise at least one connecting device for fixating the housing cover to the air filter housing.

According to an example embodiment, the connecting device may be connected to one of the air filter housing and the housing cover. The connecting device may preferably extend over the sealing flange for attachment to a connecting part of the other one of the air filter housing and the housing cover.

Hereby, the housing cover is well attached to the air filter housing which also improves the sealing between the housing cover and the air filter housing. The connecting device may come in different forms, such as e.g. an elastic strap, a metal clip, etc.

According to an example embodiment, the air filter housing may comprise an air inlet conduit positioned in the vicinity of the first axial end portion of the air filter housing. According to an example embodiment, the air filter housing may comprise an air outlet at the second axial end portion of the air filter housing.

Hereby, ambient air is directed into the air filter housing in the vicinity of the first axial end portion. The ambient air is thereafter directed through the air filter, where the air is cleaned. Finally, the cleaned air is directed out through the air outlet at the second axial end portion.

According to an example embodiment, the air outlet may be arranged in a wall portion of the air filter housing, the wall portion being defined by a plane which is perpendicular to the axial direction of the air filter housing arrangement.

According to an example embodiment, the air filter housing may comprise a filter guiding portion at the first axial end portion thereof. Preferably, the filter guiding portion is a protruding portion for connecting with a corresponding notch of the cylindrical air filter. Hereby, the filter can be guided to be arranged at a specific and predefined radial position within the filter housing arrangement. Also, using a filter guiding portion will attach the filter properly within the air filter housing.

According to a second aspect, there is provided a vehicle air cleaner for cleaning air supplied to a vehicle engine, the air cleaner comprises an air filter housing arrangement according to any one of the above described embodiments in relation to the first aspect, and a cylindrical air filter arranged between the first and second axial end portions of the air filter housing.

Effects and features of the second aspect are largely analogous to those described above in relation to the first aspect.

According to a third aspect, there is provided a vehicle comprising an internal combustion engine and a vehicle air cleaner according to the second aspect described above. The vehicle air cleaner is arranged upstream the internal combustion engine for at least partially removing particles from air before the air is provided to the internal combustion engine.

Effects and features of the third aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
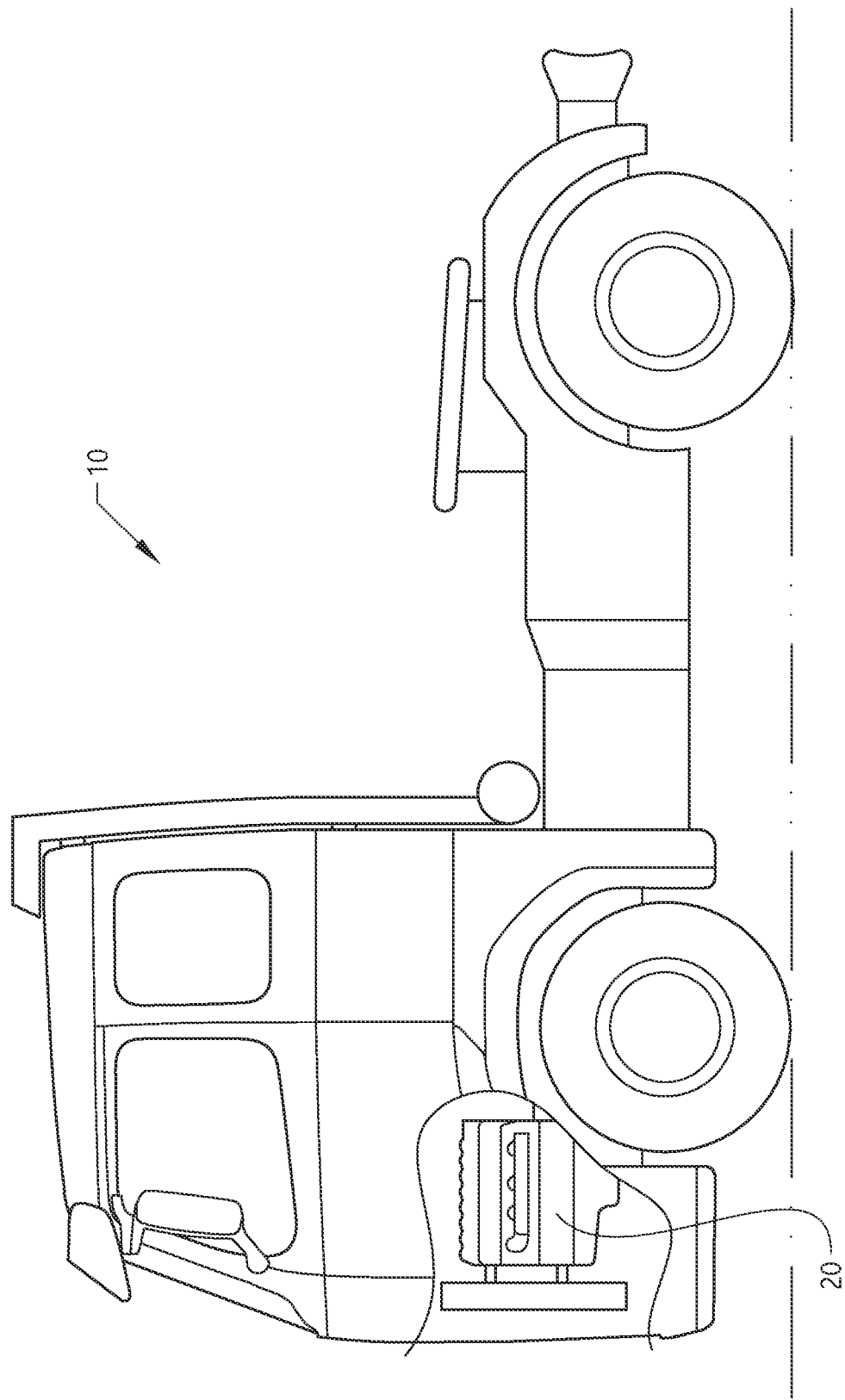
FIG. 1 is a lateral side view illustrating an example embodiment of a vehicle in the form of a truck.

The present disclosure will now be described more fully hereinafter with reference to the accompanying drawings, in which an exemplary embodiment is shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 20 in the form of an internal combustion engine arrangement 20. The internal combustion engine arrangement 20 may preferably be fueled by e.g. a conventional fuel such as diesel, although other alternatives are conceivable. The internal combustion engine 20 is preferably a piston-cylinder arrangement operated in a four stroke fashion, i.e. operated by an intake stroke, a compression stroke, a combustion stroke, and an exhaust stroke. The vehicle 10 in FIG. 1 further comprises a vehicle air cleaner (600 in FIGS. 2 and 3), which air cleaner is arranged upstream the intake of the internal combustion engine arrangement 20.

Figure 2:
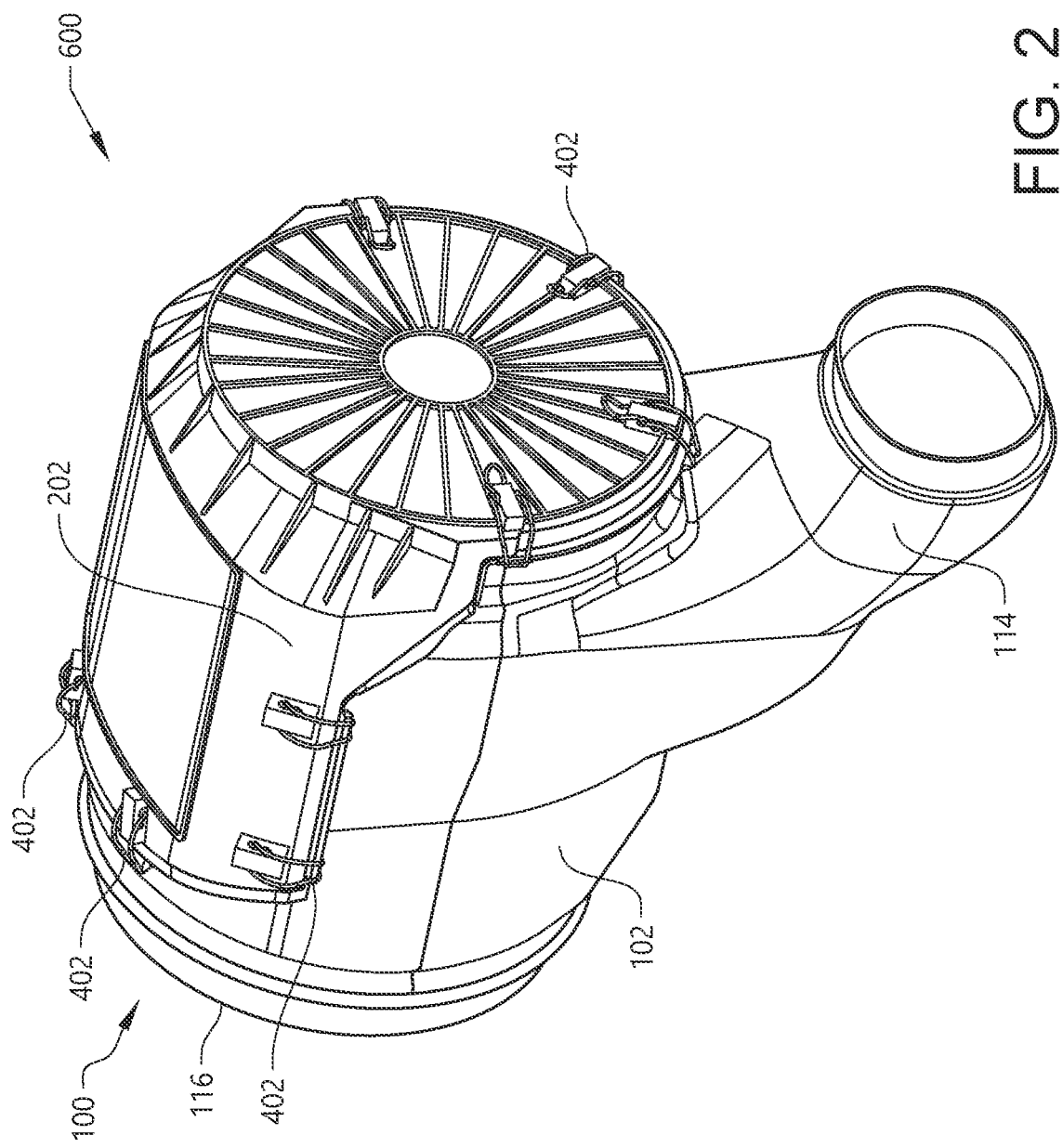
FIG. 2 is a perspective view of an air filter housing arrangement, and a vehicle air cleaner according to an example embodiment.
Figure 3:
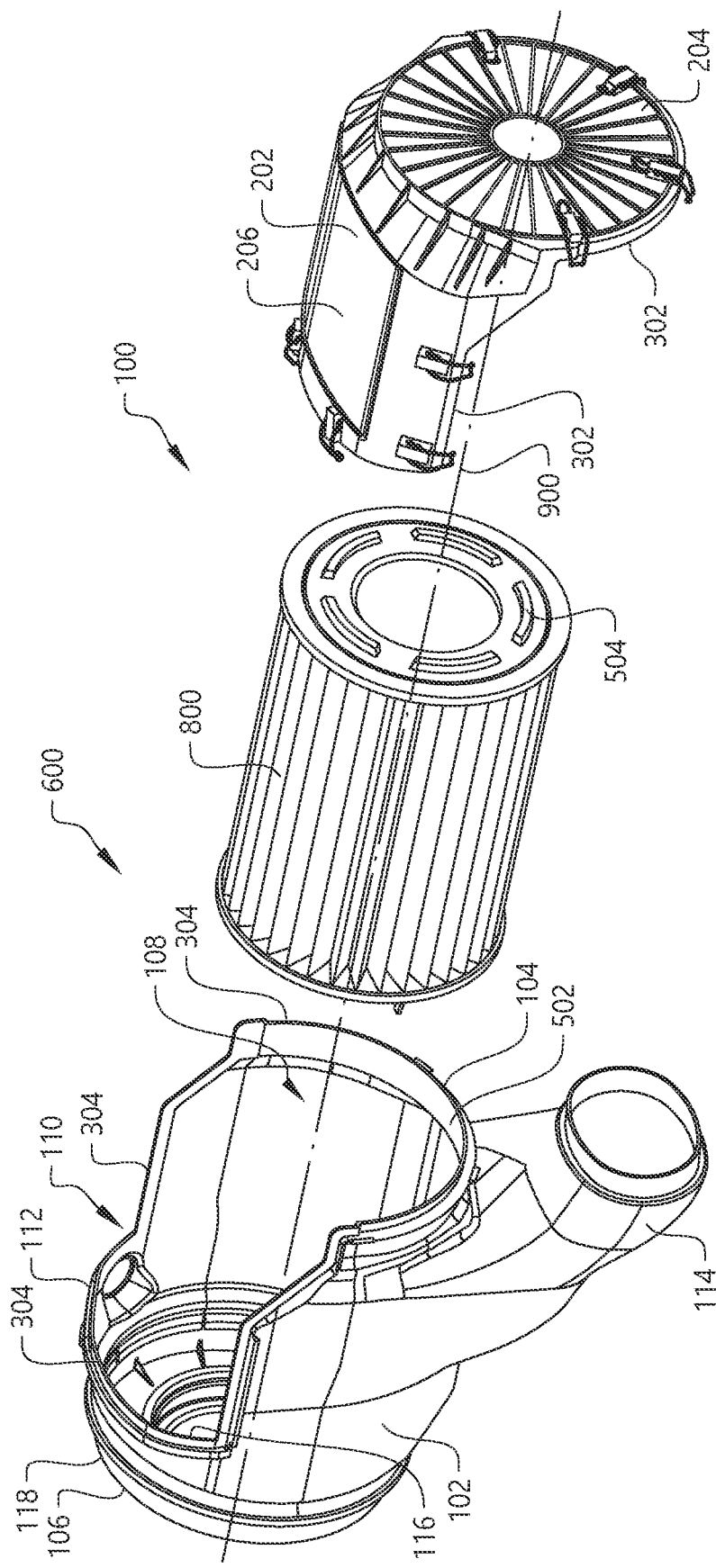
FIG. 3 is an exploded view, including a cylindrical air filter, of the air filter housing arrangement and vehicle air cleaner in FIG. 2.
Figure 4:
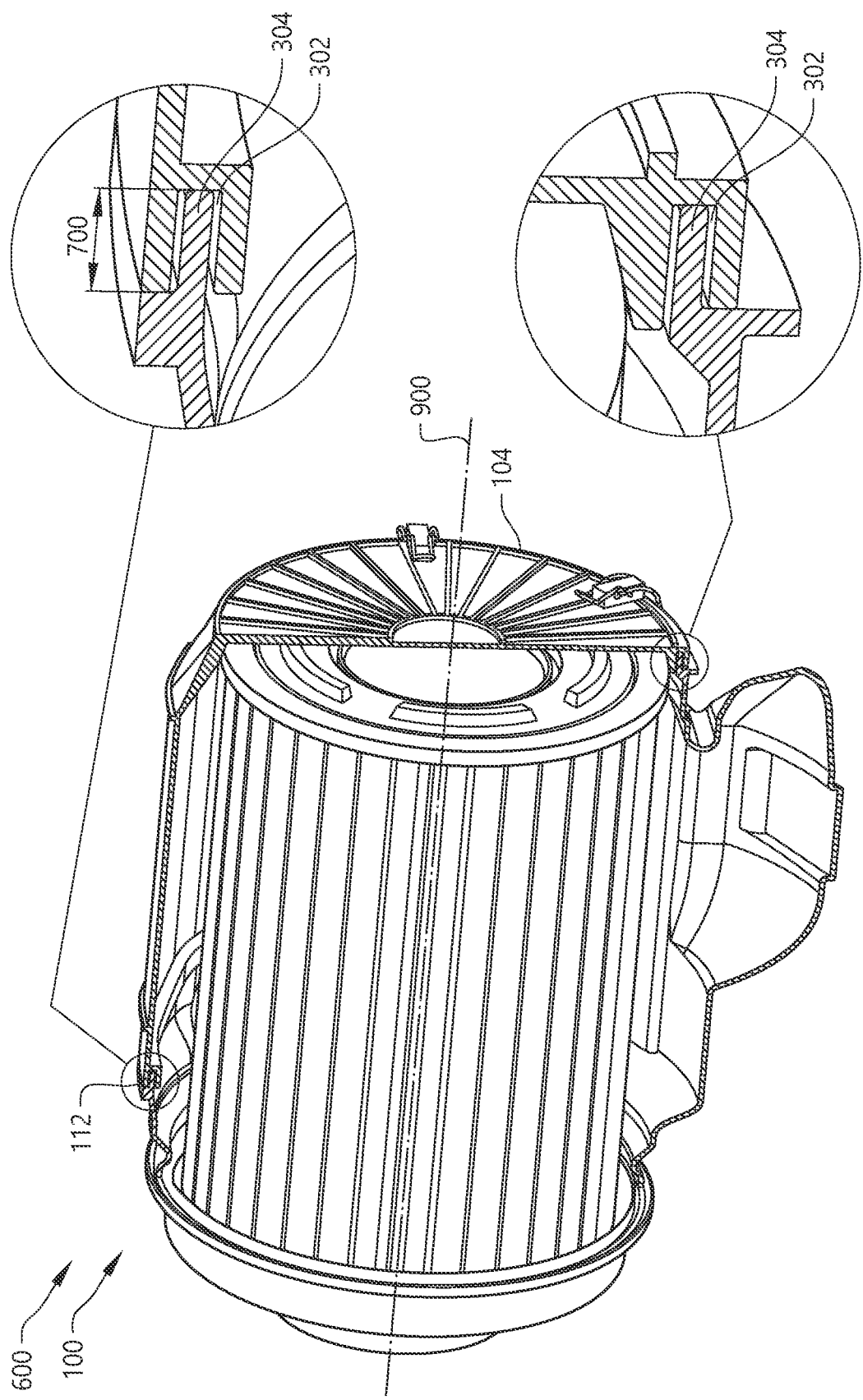
FIG. 4 is a detailed illustration of the interconnection between the air filter housing and the housing cover of the air filter housing arrangement according to an example embodiment.

In order to describe the vehicle air cleaner 600, and in particular, the air filter housing arrangement 100 of the vehicle air cleaner 600, reference is made to FIGS. 2-4.

Reference is initially made to FIG. 2 which illustrates the vehicle air cleaner 600 according to an example embodiment. The vehicle air cleaner 600 comprises an air filter housing arrangement 100 arranged to contain a cylindrical air filter (see FIG. 3). More particular, the air filter housing arrangement 100 comprises an at least partially cylindrical air filter housing 102 and a removable housing cover 202. The air filter housing 102 is thus arranged as a lower portion of the air filter housing arrangement 100 while the removable housing cover 202 is arranged as an upper portion of the air filter housing arrangement 100. The housing cover 202 is connected to the air filter housing 102 by means of at least one connecting device 402. In FIG. 2, the housing cover 202 is connected to the air filter housing 102 by a plurality of connecting devices 402 in the form of clips which are arranged on the housing cover and snapped onto a portion of the air filter housing 102. Moreover, the air filter housing 102 is connected to the housing cover 202 by means of a sealing flange and a sealing groove. This sealing interface is described in further detail with reference to FIGS. 3 and 4.

Furthermore, the vehicle air cleaner 600, and more particularly the air filter housing arrangement 100 comprises an air inlet conduit 114 and an air outlet 116. More particularly, the air inlet conduit 114 is arranged to convey ambient air to the air filter within the air filter housing arrangement 100. The ambient air is cleaned by the filter and further directed towards the inlet of the internal combustion engine 20 through the air outlet 116 of the air filter arrangement 100.

In order to describe the air filter housing arrangement 100 in further detail, reference is made to FIG. 3 which is an exploded view of the vehicle air cleaner 600 and air filter housing arrangement 100 according to an example embodiment. As described in relation to FIG. 2, the vehicle air cleaner 600 comprises the air filter housing arrangement 100 formed by the at least partially cylindrical air filter housing 102 and the removable housing cover 202, whereby the cylindrical air filter 800 is substantially encapsulated within the air filter housing arrangement 100. The cylindrical air filter 800 is thus tubular and comprises a cylindrical cross section.

As can be seen in FIG. 3, the air filter housing 102 is at least partially cylindrical and comprises a first axial end portion 104 and a second axial end portion 106. The cylindrical air filter 800 is thus preferably connected to the air filter housing 102 between the first 104 and second 106 axial end portions. Moreover, the air filter housing 102 comprises a first open portion 108 at the first axial end portion 104 and a second open portion 110 at an upper radial position of the air filter housing 102. More particularly, the second opening 110 is arranged as an open portion in the axial direction 900 from the first axial end 104 portion to an axial end portion 112 thereof. The axial end portion 112 of the second opening can be arranged at the second axial end portion 106 of the air filter housing. The axial end portion 112 of the second opening can also, as depicted in FIG. 3, be arranged at an axial distance from the second axial end portion 106. The air filter housing 102 is open in both an axial end and a radial end for being able to receive/remove the air filter 800 radially and/or axially.

Preferably, a width of the second open portion 110 is larger than the diameter of the cylindrical air filter 800. Similarly, a diameter of the first open portion 108 is preferably also larger than the diameter of the cylindrical air filter 800.

As is further depicted, the air inlet conduit 114 is positioned in the vicinity of the first axial end portion 104, and the air outlet 116 is arranged at the second axial end portion 106. More particular, the air outlet 116 is arranged in a wall portion 118 of the air filter housing 102. The wall portion 118 is defined by a plane which is perpendicular to the axial direction 900 of the air filter housing arrangement 102.

Furthermore, the removable housing cover 202 comprises a first surface 204 arranged to cover the first open portion 108 of the air filter housing 102, and a second surface 206 arranged to cover the second open portion 110 of the air filter housing 102. In particular, the first surface is in the depicted embodiment arranged as a circular area defined by a plane perpendicular to the axial direction 900 of the air filter housing arrangement 102, while the second surface 206 extends from the first surface 204 in an axial direction towards the second axial end portion 106. The second surface 206 is thus arranged as a semi-circular surface for covering the second open portion 110.

As described above, the air filter housing 102 and the housing cover 202 are connected at a sealing interface formed by a sealing flange 304 and a sealing groove 302. With particular reference to FIGS. 3 and 4, the sealing flange 304 forms part of the air filter housing 102 and the sealing groove 302 forms part of the housing cover 202. It should be observed that the sealing flange 304 may equally as well form part of the housing cover 202, in which case the sealing groove 302 forms part of the air filter housing 102. The sealing flange 304 and sealing groove 302 are preferably arranged as a respective continuous portion around the entire first 108 and second 110 openings.

The sealing flange 304 is arranged to protrude into the sealing groove 306, which is clearly illustrated in FIG. 4. Preferably, the sealing groove is arranged in a U-shaped configuration into which the sealing flange 304 protrudes. The sealing flange 304 preferably protrudes a distance 700 into the sealing groove 302. The distance 700 is preferably between 5-40 mm, and more preferably 10-30 mm.

Moreover, as is also best seen in FIG. 4, the sealing flange 304 protrudes into the sealing groove 302 in the axial direction at the axial end portion 112 of the second open portion 110, as well as at the first axial end portion 104 of the air filter housing 102. Thus, at the axial end portion 112 of the second open portion 110 and at the first axial end portion 104 of the air filter housing 102, the sealing groove 302 is open in the axial direction 900 for receiving the sealing flange 304. As is best seen in FIG. 3, the sealing flange 304 protrudes in the circumferential direction between the first axial end portion 104 of the filter housing 102 and the axial end portion 112 of the second open portion 110. Thus, between the first axial end portion 104 of the filter housing 102 and the axial end portion 112 of the second open portion 110, the sealing groove 302 is open in the circumferential direction for receiving the sealing flange 304.

By means of the arrangement of the sealing flange 304 and sealing groove 302, disconnection of the housing cover 202 from the air filter housing 102 is preferably made by an initial axial displacement of the housing cover 202, whereafter the housing cover 202 can be fully removed from the air filter housing 102 by moving the housing cover 202 in the radial direction and/or in the axial direction. Similarly, when connecting the housing cover 202 to the air filter housing 102, the housing cover 202 can be provided from a radially and/or axially remote position from the air filter housing, where after final connection is made by axially forcing the housing cover to connect to the air filter housing such that the sealing flange 304 protrudes into the sealing groove 302 around the continuous edge.

Still further, as an alternative depicted in FIG. 3, the air filter housing preferably comprises a guiding portion 502 for connecting the air filter 800 at a specific radial position. The guiding portion 502 is preferably arranged as a protruding portion for connecting to a notch 504 or the like of the air filter 800.

It is to be understood that the present disclosure is not limited to the embodiments described above and illustrated in the drawings; rather, the skilled person will recognize that many changes and modifications may be made within the scope of the appended claims.

The invention claimed is:

1. An air filter housing arrangement for a cylindrical air filter, comprising:
   an at least partially cylindrical air filter housing arranged to accommodate the cylindrical air filter, the air filter housing comprising:
      a first axial end portion and
      a second axial end portion,
      a first open portion at the first axial end portion, and
      a second open portion at an upper radial position of the air filter housing for allowing connection/removal of the cylindrical air filter in both an axial direction and a radial direction; and
   a removable housing cover comprising a first surface arranged to cover the first open portion of the air filter housing, and a second, axially extending surface arranged to cover the second open portion of the air filter housing,
   wherein one of the air filter housing and the housing cover comprises a sealing groove and the other one of the air filter housing and the housing cover comprises a sealing flange connected into the sealing groove for providing a seal between the air filter housing and the housing cover,
   wherein the sealing flange protrudes into the sealing groove in the axial direction at an axial end portion of the second open portion, and
   wherein the sealing flange protrudes into the sealing groove in a circumferential direction between the first axial end portion of the filter housing and the axial end portion of the second open portion.

2. The air filter housing arrangement of claim 1, wherein the sealing flange protrudes into the sealing groove in the axial direction at the first axial end portion of the air filter housing.

3. The air filter housing arrangement of claim 1, wherein the first and second open portions are formed by a continuous edge, wherein the sealing flange/sealing groove is formed throughout the continuous edge.

4. The air filter housing arrangement of claim 1, wherein the sealing flange protrudes a distance between 5-40 mm into the sealing groove.

5. The air filter housing arrangement of claim 1, further comprising at least one connecting device for fixating the housing cover to the air filter housing.

6. The air filter housing arrangement of claim 5, wherein the connecting device is connected to one of the air filter housing and the housing cover, the connecting device extending over the sealing flange for attachment to a connecting part of the other one of the air filter housing and the housing cover.

7. The air filter housing arrangement of claim 1, wherein the air filter housing comprises an air inlet conduit positioned in the vicinity of the first axial end portion of the air filter housing.

8. The air filter housing arrangement of claim 1, wherein the air filter housing comprises an air outlet at the second axial end portion of the air filter housing.

9. The air filter housing arrangement of claim 8, wherein the air outlet is arranged in a wall portion of the air filter housing, the wall portion being defined by a plane which is perpendicular to the axial direction of the air filter housing arrangement.

10. The air filter housing arrangement of claim 1, wherein the air filter housing comprises a filter guiding portion at the first axial end portion thereof.

11. The air filter housing arrangement of claim 10, wherein the filter guiding portion is a protruding portion for connecting with a corresponding notch of the cylindrical air filter.

12. A vehicle air cleaner for cleaning air supplied to a vehicle engine, the air cleaner comprising:
   an air filter housing arrangement comprising:
      an at least partially cylindrical air filter housing arranged to accommodate the cylindrical air filter, the air filter housing comprising:
         a first axial end portion and
         a second axial end portion,
         a first open portion at the first axial end portion, and
         a second open portion at an upper radial position of the air filter housing for allowing connection/removal of the cylindrical air filter in both an axial direction and a radial direction; and
      a removable housing cover comprising a first surface arranged to cover the first open portion of the air filter housing, and a second, axially extending surface arranged to cover the second open portion of the air filter housing,
      wherein one of the air filter housing and the housing cover comprises a sealing groove and the other one of the air filter housing and the housing cover comprises a sealing flange connected into the sealing groove for providing a seal between the air filter housing and the housing cover,
      wherein the sealing flange protrudes into the sealing groove in the axial direction at an axial end portion of the second open portion, and
      wherein the sealing flange protrudes into the sealing groove in a circumferential direction between the first axial end portion of the filter housing and the axial end portion of the second open portion; and
   a cylindrical air filter arranged between the first and second axial end portions of the air filter housing.

13. A vehicle comprising:
   an internal combustion engine and
   a vehicle air cleaner, comprising:
      an air filter housing arrangement comprising:
         an at least partially cylindrical air filter housing arranged to accommodate the cylindrical air filter, the air filter housing comprising:
            a first axial end portion and
            a second axial end portion,
            a first open portion at the first axial end portion, and a second open portion at an upper radial position of the air filter housing for allowing connection/removal of the cylindrical air filter in both an axial direction and a radial direction; and a removable housing cover comprising a first surface arranged to cover the first open portion of the air filter housing, and a second, axially extending surface arranged to cover the second open portion of the air filter housing, wherein one of the air filter housing and the housing cover comprises a sealing groove and the other one of the air filter housing and the housing cover comprises a sealing flange connected into the sealing groove for providing a seal between the air filter housing and the housing cover, wherein the sealing flange protrudes into the sealing groove in the axial direction at an axial end portion of the second open portion, and wherein the sealing flange protrudes into the sealing groove in a circumferential direction between the first axial end portion of the filter housing and the axial end portion of the second open portion; and a cylindrical air filter arranged between the first and second axial end portions of the air filter housing;

wherein the vehicle air cleaner being arranged upstream the internal combustion engine for at least partially removing particles from air before the air is provided to the internal combustion engine.

\* \* \* \* \*